United States Patent Office 2,840,617
Patented June 24, 1958

2,840,617

NEW POLYOLS, THEIR PREPARATION AND DERIVATIVES

Edward C. Shokal, Walnut Creek, Calif., assignor to Shell Development Company, New York, N. Y., a corporation of Delaware No Drawing. Application October 25, 1954
Serial No. 464,590

14 Claims. (Cl. 260—635)

This invention relates to new polyols, i. e., polyhydroxy compounds, and to their preparation. More particularly, the invention relates to a new class of polyols, to a process for preparing the polyols from polymers of unsaturated aldehydes, and to certain valuable derivatives of the polyols.

Specifically, the invention provides new polyols having unexpectedly high functionality, said polyols being prepared by polymerizing an alpha,beta-ethylenically unsaturated aldehyde, such as acrolein or methacrolein, in the presence of specific catalysts of the group consisting of substituted phosphines, arsines and phosphites, preferably in a solvent containing at least one OH group, and then treating the resulting polymer with hydrogen at a temperature above about 50° C. and a pressure above 50 p. s. i. in the presence of a hydrogenation catalyst. The invention further provides valuable derivatives of the above-described polyols and particularly their monomeric and polymeric esters.

It is known that unsaturated aldehydes, such as acrolein, may be polymerized by the addition of materials, such as sodium hydroxide and sodium carbonate. Little use for these polymers as such has been found, however, and considerable effort has been put forth to try and convert the polymers to more useful products. Some attempts have been made, for example, to hydrogenate the polymers to form polymeric polyhydric alcohols. These attempts, however, have not been successful because the aldehyde polymers produced by these prior known methods have been resistant to hydrogenation and/or have been depolymerized in the presence of the hydrogen to form useless products. Some polymeric polyhydric alcohols have been prepared from the unsaturated aldehydes but in this case it was first necessary to form a polymer of an ester derivative of the aldehyde, subject the polymer to hydrolysis and then hydrogenate the resulting polymeric aldehyde-ester. This method is not attractive because it is rather expensive and the resulting products still possess some ester groups and have rather low OH functionality.

It is an object of the invention to provide a new class of polyols of high functionality. It is a further object to provide new polyols and a method for preparing the new polyols from polymers of unsaturated aldehydes, such as acrolein. It is a further object to provide new polyols of high functionality which are particularly useful and valuable in industry. It is a further object to provide new polyols which are useful as lubricants and blending agents. It is a further object to provide new polyols which are particularly valuable in the preparation of alkyd resins. It is a further object to provide new polyols which are useful in the preparation of ester plasticizers. It is still a further object to provide a process for preparing polyols in high yields and in an economic manner from polymer of acrolein and methacrolein. Other objects and advantages of the invention will be apparent from the following detailed description thereof.

It has now been discovered that these and other objects may be accomplished by the new polyols of the present invention which are obtained by polymerizing an alpha,beta-ethylenically unsaturated aldehyde, such as acrolein and methacrolein, in the presence of a specific catalyst of the group consisting of organo-substituted phosphines, arsines, and phosphites, preferably in a solvent containing at least one OH group, and then treating the resulting polymer with hydrogen at a temperature above 50° C. and pressure above 50 p. s. i. in the presence of a hydrogenation catalyst. It has been unexpectedly found that the polymers of the unsaturated aldehydes formed in the presence of the special catalysts as indicated above are surprisingly different from those prepared from other catalysts, such as those prepared from sodium hydroxide, and can be easily and economically hydrogenated to form polyols having high functionality. Polyacrolein formed in the presence of these catalysts, can for example, be easily hydrogenated to form polyallyl alcohol having high OH values such as e. g., about .5 to 1.0 eq./100 g. In addition, the polyols formed by this method easily undergo further reaction, such as esterification, to form many useful and valuable products. The new polyols are, for example, easily cooked with polybasic acids or anhydrides to form valuable alkyd resins which may be used in baking enamels, varnishes and the like.

The catalysts used in the polymerization of the alpha, beta-ethylenically unsaturated aldehydes are members of the group consisting of organo-substituted phosphines, arsines and phosphites. The substituted phosphines useful as catalysts are those of the formula $P(R)_3$ wherein at least one R is an organic radical and the other R's may be hydrogen or organic radicals. Particularly preferred phosphines include the trihydrocarbyl phosphines, the dihydrocarbyl phosphines and monohydrocarbyl phosphines, such as tricyclohexyl phosphines, 3,3,5-trimethylcyclohexyl phosphine, triphenyl phosphine, trioctyl phosphine, diphenyl cyclohexyl phosphine, tributyl phosphine, trihexenyl phosphine, trixylyl phosphine, triethyl phosphine, dicyclohexyl phosphine, tridodecyl phosphine, tricyclohexenyl phosphine, cyclohexyl phosphine and trihexyl phosphine. Particularly preferred phosphines include the trialkyl, the tricycloalkyl, the tri(alkylcycloalkyl), the triaryl and tri(alkaryl) phosphines and particularly those wherein each alkyl, cycloalkyl, alkylcycloalkyl, aryl and alkaryl radicals contain no more than 12 carbon atoms, and especially not more than 9 carbon atoms.

The organo-substituted arsines useful as catalysts are those of the formula $As(R)_3$ wherein at least one R is an organic radical and the other R's may be hydrogen or organic radicals. Particularly preferred arsines include the trihydrocarbyl arsines, the dihydrocarbyl arsines, and the monohydrocarbyl arsines, such as tricyclohexyl arsine, triphenyl arsine, trioctyl arsine, tributyl arsine, trixylylarsine, triethyl arsine, dicyclohexyl arsine, trihexenyl arsine, tri-3,3,5-trimethyl cyclohexyl phosphine, tricyclohexenyl arsine, and trihexyl arsine. Particularly preferred arsines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and especially not more than 9 carbon atoms.

The substituted phosphites useful as catalysts are preferably those of the formula

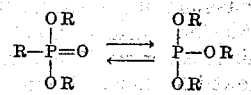

wherein at least one R is an organic radical and the other R's may be hydrogen or organic radicals. Preferred phosphites include the trihydrocarbyl, dihydrocarbyl and monohydrocarbyl phosphites, such as tricyclohexyl phosphite, triphenyl phosphite, triethyl phosphite, tridecyl phosphite, trioctadecyl phosphite, triallyl phosphite, tricyclohexenyl phosphite, trixylyl phosphite, triisohexyl phosphite, tri(2,3-dibutylcyclohexyl) phosphite, trioctadecenyl phosphite, diphenyl hydrogen phosphite, diphenyl cyclohexyl phosphite, methyl butyl phosphite, dicyclohexyl hydrogen phosphite, diallyl hydrogen phosphite, allyl phosphite and octyl phosphites. Particularly preferred phosphites include the trialkyl, tricycloalkyl, tri(alkcycloalkyl) triaryl phosphites and tri(alkaryl) phosphites and particularly those wherein each alkyl, cycloalkyl, alkcycloalkyl, aryl and alkaryl radicals contains no more than 12 carbon atoms and especially no more than 9 carbon atoms.

The amount of catalyst employed in the polymerization of the unsaturated aldehydes may vary over a considerable range. The amount may range from as low as 0.01% to as high as 10% or more of the total weight of the monomer being polymerized. In most cases, however, amounts of catalyst varying from .1% to 5% by weight of monomer are sufficient to effect a rapid reaction and this is the preferred range to be employed.

The polymerization may be carried out at temperatures ranging from about −50° C. to 250° C. Temperatures below about 0° C. are seldom employed however, and the reaction is preferably conducted at temperatures ranging from 0° C. to 100° C. In many cases there may be a slight induction period in which no activity is shown and then the reaction may take place very rapidly. In this case, it may be desirable to employ relatively high temperatures at the beginning to lessen the induction period, and then remove the heat after the reaction has commenced.

The polymerization may be effected in bulk, solvent or aqueous emulsion or suspension systems. For most practical purposes it is preferred to conduct the polymerization in bulk, in water or in a solvent, such as for example, benzene, toluene, ethanol, methanol, dioxane, acetonitrile, isopropyl ether, acetone-water mixtures, and the like. The polymerization is preferably accomplished in the presence of liquids containing at least one OH group, such as for example, water, ethanol, propanol, ethylene glycol, diethylene glycol, methanol, isopropanol, butanol and the like and mixtures thereof. Alkanols preferably containing from 1 to 6 carbon atoms are particularly preferred. Polymers formed in the presence of these materials are particularly easy to hydrogenate. When polymerization is conducted in a liquid medium, the concentration of monomer may be varied over a wide range but is preferably maintained from about 10% to 60% by weight of the liquid employed.

After the polymerization has been accomplished, the polymeric aldehydes may be recovered from the reaction mixture by any suitable means, such as filtration, extraction and the like, and the catalysts removed from the polymer by washing with water or other suitable solvents.

The polymers formed by the above-described process are generally viscous liquids to solids having a molecular weight (determined ebullioscopically in tetrachloroethane) of between about 400 to about 4500.

The preparation of several polymers of the unsaturated aldehydes is illustrated by the following:

POLYMER A 300 parts of ethanol and 3 parts of triphenyl phosphine were mixed in a reaction vessel. The mixture was kept at 40° C.–50° C. and 275 parts of acrolein (made up of a solution containing 40% acrolein, 40% water and 20% ethanol) was slowly added with stirring. The temperature was maintained at 40–50° C. for 1 hour and the mixture then allowed to stand. Removal of the ethanol and water yielded a yellow solid.

POLYMER B 300 parts of ethanol and 0.5 part trixylyl phosphine were mixed in a reaction vessel. The mixture was kept at 25° C., and 200 parts of acrolein slowly added with stirring. The temperature began to rise but was kept between 25° C.–40° C. The mixture was allowed to stand overnight and then distilled under vacuum to remove the ethanol. The resulting product was a light yellow colored solid.

POLYMER C 1.0 part of tris(3,3,5-trimethylcyclohexyl) phosphine was dissolved in 300 parts of benzene. To this mixture was added slowly with stirring 200 parts of acrolein. The temperature was maintained at 40–50° C., for about 3 hours and the mixture allowed to stand overnight. The mixture was then distilled to remove benzene. The resulting product was a light yellow colored solid.

POLYMER D 300 parts of ethanol and 1 part of trioctyl phosphine are mixed in a reaction vessel. The mixture is kept at 50° C., while 300 parts of acrolein are added. The temperature is kept at 50–60° C., for 4 hours and the mixture then allowed to stand. Removal of the ethanol yields a light yellow colored solid.

Related polymers are obtained by replacing the trioctyl phosphine with the same amount of each of the following: trihexyl phosphine, tridecyl phosphine, tricyclohexyl phosphine and triallyl phosphine.

POLYMER E 30 parts of ethanol and 1 part of triphenyl arsine mixed in a reaction vessel. The mixture was kept at 40° C.– 50° C., and 200 parts of acrolein slowly added with stirring. The temperature was kept at 50–60° C., for 24 hours and then allowed to stand. Removal of the ethanol yields a light yellow color solid.

POLYMER F 300 parts of ethanol and 1.5 parts of trioctyl arsine are mixed in a nitrogen blanketed reaction vessel. The mixture is kept at 50° C., and 200 parts of acrolein slowly added. The temperature is kept at 60° C., for several hours and then allowed to stand. Removal of the ethanol yields a transparent solid.

Polymers having related properties are obtained by replacing trioctyl arsine in the above process with equal amounts of each of the following: tricyclohexyl arsine, tridodecyl arsine and trihexenyl arsine.

POLYMER G 1.0 part of trioctyl phosphite is dissolved in 300 parts of benzene. To this mixture is slowly added with stirring 200 parts of acrolein. The temperature was maintained at 50° C., for about 4 hours and the mixture allowed to stand overnight. Removal of the benzene yields a light colored solid.

POLYMER H 1.5 parts of diphenyl phosphite is dissolved in 300 parts of benzene and to this mixture added slowly stirring about 200 parts of acrolein. The temperature was maintained at 40° C. to 60° C., for several hours and then the mixture allowed to stand. Removal of the benzene yields a light colored solid.

The hydrogenation of the above-described aldehyde polymers may be accomplished in the presence or absence of added diluents or solvents. In some cases, it may be desirable to employ solvents, which are relatively inert to the hydrogenation reaction, such as ethanol, isopropanol, ethylene glycol, dioxane, and the like, and mixtures thereof, to facilitate operation of the process.

Catalysts that are used in the hydrogenation are preferably the metals of groups I, II and VI to VIII of the Periodic Table of Elements, their alloys and derivatives such as their sulfides, oxides and chromites. Examples of suitable catalysts include silver, copper, iron manganese, molybdenum, nickel, palladium, platinum, chromium, cobalt, rhodium, tungsten, mixtures of the metals, such as copper-silver mixtures, copper-tin mixtures, nickel-cobalt mixtures, and their derivatives, such as copper oxide, copper chromite, nickel sulfide, silver sulfide, nickel chromite, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 5% to 10% by weight. The above-noted preferred catalysts are generally employed in amounts varying from 5% to 10% by weight.

Temperatures used during the hydrogenation will be at least above 50° C., and not in excess of 250° C. Particularly preferred temperatures range from 75° C. to 150° C. Hydrogen pressures of at least 50 pounds per square inch may be used, but higher pressures of the order of about 250 to 3000 p. s. i. are generally more preferred. Particularly preferred hydrogen pressures range from about 500 p. s. i. to 2000 p. s. i.

The hydrogenation may be executed in any suitable manner and in any suitable apparatus of the type that is customarily employed for hydrogenation processes. A method of carrying out the process that has been found to be advantageous comprises placing the polymer, solvent and catalyst in a pressure-resistant vessel equipped with the necessary inlets and outlets, heating means, pressure gauge, thermometer, etc., and desirably with means for agitating the contents, and subjecting the resulting mixture to the action of hydrogen gas under the aforedescribed conditions of temperature and pressure in the presence of the catalyst until absorption of hydrogen is for practical purposes complete.

At the completion of the hydrogenation, the polymeric alcohol may be recovered from the reaction mixture by any suitable manner. For example, the hydrogenation catalyst, if depersed in the reaction mixture, may be removed by filtration, centrifugation, etc. The desired polymeric alcohol may be recovered and purified by any suitable means, such as high vacuum distillation, solvent extraction, and the like.

The polymeric polyhydric alcohols produced by the hydrogenation of the polymeric aldehydes are useful for a great many important applications. They are useful, for example, as sizing materials for textiles, as creaseproof impregnating agents for paper, electroplating bath additives, and the like. They are also useful as chemical intermediates in the preparation of other valuable materials. They may be reacted with aldehydes, for example, to form resinous acetals, with nitric acid to form nitrate explosives, and with unsaturated acids to form drying oils.

The polyols are particularly valuable, however, in the preparation of modified alkyd resins. The polyols impart fast drying and baking characteristics and produce films having good hardness and flexibility.

The polycarboxylic acids which may be reacted with the novel polyols to prepare the above-described alkyd resins may be of any suitable type. They may be saturated, unsaturated, cyclic, aromatic and may possess two, three or more carboxyl groups. Examples of these acids include, among others, phthalic acid, isophthalic acid, terephthalic acid, tetrachlorophthalic acid, glutaric acid, adipic acid, diglycolic acid, succinic acid, pimelic acid, suberic acid, cyclohexanedicarboxylic acid, meleic acid, fumaric acid, itaconic acid, 1,8-naphthalenic acid, and the like. Preferred polycarboxylic acids to be used in producing the alkyds comprise the unsubstituted dicarboxylic acids containing no more than 16 carbon atoms, such as, for example, the alkanedioic, cycloalkanedioic acid, aromatic hydrocarbon dicarboxylic acids and the alkyl-substituted aromatic hydrocarbon dicarboxylic acids.

The modifying agents employed in producing the above-described alkyds comprising monohydric alcohols, as allyl alcohol, butyl alcohol, and octyl alcohol, monocarboxylic acids, such as, for example, butyric acid, capric acid, cyclohexanecarboxylic acid, chlorobutyric acid, benzoic acid, p-tert-butylbenzoic acid, 3,5-di-tert-butylbenzoic acid, chlorobenzoic acid, fatty acids derived from natural oils, as drying oils, semi-drying oils and non-drying oils, such as linseed, soybean, perilla, tung, walnut, pineseed, olive, oiticica, corn cottonseed, cocoanut, hemp seed, herring, poppy seed, mustard, peanut, rapeseed, salmon, dehydrated castor oil, rubber seed, safflower, and the like, and mixtures thereof. Particularly modifiers comprise the non-drying oil, semi-drying oil and drying oil fatty acids, and particularly those derived from dehydrated castor oil, soybean oil, linseed oil, cocoanut oil, safflower oil and oiticica oil.

The alkyd resins are preferably prepared by heating the polyol with the polycarboxylic acids (or its anhydride) and the modifiers together, preferably in an inert atmosphere. Ordinarily, no catalyst need be employed to effect this reaction, but, if desired, substances as p-toluenesulfonic acid, zinc chloride, stannic chloride, calcium acetate, barium acetate, and the like, in amounts varying from about 0.1% to 5% by weight of reactants may be employed.

The proportions of reactants to be used in preparing the alkyds may vary depending upon the properties desired in the finished product. Ordinarily, the polycarboxylic acid or anhydride will be reacted with at least a chemical equivalent amount of the polyol and satisfactory results are obtained when up to 50% excess of the polyol is employed. A "chemical equivalent amount" as used herein in this regard refers to that amount of alcohol needed to furnish one OH group for every carboxyl group. In order to obtain superior alkyds, one preferably reacts the acid or anhydride with an excess up to 40% excess of the polyol.

The amount of the modifier to be combined with the polycarboxylic acid or anhydride and polyol will vary over a wide range depending on the type selected and the product desired. Generally, the amount of the modifier will vary from 20% to 80% by weight of the resinous product, with a preferred range of proportions varying from 30% to 70% by weight of the resin.

The temperature employed during the resin-forming reaction may vary over a considerable range depending upon the type of reactants, catalyst, etc. In most cases, the temperature will range between about 100° C., and 280° C., with a preferred range of between 200° C. to 250° C.

The alkyd formation may be accomplished in the presence or absence of diluents. If solvents and diluents are employed, it is desirable to utilize inert organic compounds, such as benzene, toluene, xylene, cyclohexane, and the like, and mixtures thereof.

It is preferred to accomplish the preparation of the alkyd resins under a blanket of an inert gas, at least during the initial stages of the reaction. By an inert gas is meant one substantially devoid of molecular oxygen, such as nitrogen, carbon dioxide, helium, methane, and the like.

When the reaction is substantially complete, the inert solvents or diluents, remaining water and uncombined reactants are preferably removed from the reaction mixture. Removal is conveniently accomplished by vacuum distillation, although fractional distillation, precipitation, may also be utilized.

The alkyds prepared from the new polyols are particularly valuable in the preparation of air-drying or baking coating compositions. For this application, they may be combined with various coating solvents or oils or may be added to compositions containing film-forming components such as vinyl polymers, aminoplast resins, cellulose ethers and esters and the like. The oil-modified alkyds are particularly useful in the preparation of baking lacquers and enamels. In this case they are preferably combined with ureaformaldehyde or melamine-formaldehyde resins and other desired components, such as pigments, plasticizers, stabilizers, and the like, and the mixture then diluted with solvents or diluents to provide a composition having the desired viscosity. This composition may then be applied to the desired surface and baked at temperatures generally varying from 100° C., to 175° C. The resulting baked films are very hard and have good flexibility.

The new polyols of the present invention may also be used to produce valuable monomeric esters and ethers. The esters of the polyols and monocarboxylic acids or acid esters of polycarboxylic acids are especially useful as plasticizers for vinyl polymers, and particularly the vinyl halide polymers, as they are compatible therewith and form very hard flexible films. The monocarboxylic acids used in producing such esters may be exemplified by butyric acid, hexanoic acid, caprylic acid, pelargonic acid, capric acid, lauric acid, palmitic acid, stearic acid, arachidic acid, sorbic acid, acrylic acid, methacrylic acid, crotonic acid, alpha-chloroacrylic acid, cyclohexanecarboxylic acid, toluic acid, methylbenzoic acid, nonylbenzoic acid, oleic acid, and the like and mixtures thereof. Mixed esters wherein one of the monocarboxylic acids is an aromatic acid and the other acid or acids in an aliphatic open-chain fatty acid are particularly good plasticizers for the vinyl halide polymers. The esters of the polyols and the unsaturated acids, such as acrylic acid and methacrylic acid, or the esters of the polyols and acid esters of polycarboxylic acids and unsaturated alcohols, such as allyl hydrogen maleate, are valuable as polymerizable plasticizers for the vinyl halide polymers as they may be mixed with vinyl halide polymers and a free radical yielding catalyst, such as a peroxide catalyst, and the combination then heated to effect polymerization. The product prepared in this monomer are very hard and tough but still highly flexible. The products plasticized in this monomer are useful in preparation of floor tile, seat covers, draperies and the like.

The new polyols may also be used to produce polyepoxy ethers which are valuable in the formation of pottings and castings. This may be accomplished by reacting the polyol with an epoxy-halo-substituted alkane or dihalo-hydroxy-substituted alkane to form a polyether halohydrogen and then treating that product with a dehydrohalogenating agent, such as sodium aluminate, to form the corresponding polyepoxy ether.

To illustrate the manner in which the invention may be carried out, the following examples are given. It is to be understood, however, that the examples are for the purpose of illustration and the invention is not to be regarded as limited to any of the specific materials or conditions recited therein. Unless otherwise specified, parts disclosed in the examples are parts by weight.

*Example I*

This example illustrates the preparation of a polymeric polyhydric alcohol from the polymer of acrolein prepared in the presence of triphenyl phosphine (polymer A described above).

(A) About 100 parts of polymer A is mixed with ethanol and treated with hydrogen at 100° C., and 1000 p. s. i. pressure in the presence of Raney nickel. During the first three hours, hydrogen is rapidly absorbed and about 70% of the calculated amount of hydrogen is reacted. Hydrogenation is continued for another 10 hours until about 100% of the calculated amount of hydrogen is absorbed. At the time, the product is all soluble in the ethanol. The mixture is then removed from the hydrogenation vessel, filtered and topped at 150° C., 1 mm. to give a viscous semi-solid resin having an OH value of about 1.0 eq./100 g. The polyol had a molecular weight of 407, ester value 0.019 eq./100 g. and acidity of 0.001 eq./100 g.

The polyol produced above is then reacted with an equivalent amount of phthalic anhydride, 50% by weight of the acid and polyol of soyabean fatty acids and 100 parts of xylene and the mixture heated at 250° C. to 260° C., until the acid number had been reduced to 8.0 (about 5.6 hours). Nitrogen was bubbled through the mixture to carry away the water.

A portion of the polyester prepared above was combined with .05% cobalt naphthenate and the mixture spread on tin panels and baked at 170° C. for 30 minutes. The resulting films were hard and tough.

A portion of the polyhydric alcohol produced above is also reacted with an equivalent amount of phthalic anhydride and 50% by weight of cocoanut fatty acids to form an alkyd resin which can be combined with ureaformaldehyde resin to form improved baking enamels.

Related products are obtained by replacing polymer A in the above-described method of preparing the polyol with polymer B.

(B) The ability of the polymer of acrolein produced above to be hydrogenated to form the polyhydric alcohol having a high functionality is surprising in view of the fact that other polymers prepared in the presence of acids and alkali cannot be so hydrogenated. The inability of such polymers to be hydrogenated is illustrated by the following experiment showing the results obtained with a polymer formed in the presence of NaOH.

About 100 parts of acrolein is placed in a reaction vessel and 10% sodium hydroxide slowly added. A vigorous reaction takes place and the mixture begins to boil and becomes dangerously out of control; sometimes almost explosively rapid. In a few minutes, the acrolein has all been consumed to form a hard crusty solid.

The polymer produced above is then mixed with ethanol and treated with hydrogen at 100° C., and 2000 p. s. i. pressure in the presence of Raney nickel. After 20 hours, the polymer still remains as an insoluble acrolein polymer.

*Example II*

This example illustrates the preparation of a polymeric polyhydric alcohol from the polymer of acrolein prepared in the presence of tris(3,3,5-trimethylcyclohexyl)phosphine (polymer C described above).

About 100 parts of polymer C is mixed with ethanol and treated with hydrogen at 100° C., and 1000 p. s. i. pressure in the presence of Raney nickel. During the first three hours, hydrogen is rapidly absorbed and about 70% of the calculated amount of hydrogen is reacted. Hydrogenation is continued for another 10 hours until about 100% of the calculated amount of hydrogen is absorbed. At this time, the product is all soluble in the ethanol. The mixture is then removed from the hydrogenation vessel, filtered and topped at 150° C., 1 mm. to give viscous semi-solid resin having an OH value of about 0.7 eq./100 g.

Products having related properties are obtained by replacing polymer formed with the tris(3,3,5-trimethylcyclohexyl) phosphine with equal amount of polymer D.

*Example III*

This example illustrates the preparation of a polymeric polyhydric alcohol from the polymer of acrolein prepared in the presence of triphenyl arsine (polymer E described above).

About 100 parts of polymer E is mixed with ethanol and treated with hydrogen at 100° C., and 1000 p. s. i. pressure in the presence of Raney nickel. During the first three hours, hydrogen is rapidly absorbed and about 70% of calculated amount of hydrogen is reacted. Hydrogenation is then continued for another 10 hours. At this time, the product is all soluble in the ethanol. The mixture is then removed from the hydrogenation vessel, filtered and topped at 150° C., 1 mm. to give a viscous semi-solid resin having an OH value of about 0.7 eq./100 g.

The polyhydric alcohol produced above is then reacted with phthalic anhydride and cocoanut fatty acids as shown in the preceding example to produce an alkyd useful in preparing baking enamels.

*Example IV*

This example illustrates the preparation of a polymeric polyhydric alcohol from the polymer of acrolein prepared in the presence of trioctyl arsine (polymer F described above).

About 100 parts of polymer F is mixed with ethanol and treated with hydrogen at 150° C., and 2000 p. s. i. pressure in the presence of copper chromite catalyst. In about 13 hours, all of the solid polymer had been converted to a product which dissolved in the ethanol. The mixture is then removed from the hydrogenation vessel, filtered and topped as in the preceding example. The resulting product is a viscous semi-solid resin having an OH value of about 0.69 eq./100 g.

The polyhydric alcohol produced above is then reacted with phthalic anhydride and cocoanut fatty acids as shown in Example II to produce an alkyd useful in preparing baking enamels.

*Example V*

About 100 parts of polymer G produced as shown above is mixed with ethanol and treated with hydrogen at 150° C., and 2000 p. s. i. in the presence of platinum catalyst. In about 13 hours, all of the solid polymer had been converted to a product which dissolves in the ethanol. The mixture is then removed from the hydrogenation vessel, filtered and topped as in the preceding example. The resulting product is a viscous semi-solid resin having an OH value of about .7 eq./100 g.

The polyhydric alcohol produced above is then reacted with an equivalent amount of maleic anhydride and 25% by weight of linseed oil fatty acids to form an alkyd useful in coating compositions.

Related products are obtained by replacing polymer G in the above preparation process with equal amounts of a polymer prepared in the presence of dibutyl phosphite.

*Example VI*

About 100 parts of polymer H produced as shown above is mixed with ethanol and treated with hydrogen at 150° C., and 2000 p. s. i. in the presence of Raney nickel catalyst. In a short period, all of the solid polymer had been converted to a product which dissolves in the ethanol. The mixture is then removed, filtered and topped as in the preceding example. The resulting product is a viscous liquid having an OH value of about .65 eq./100 g.

Related polyols are obtained by replacing the polymer H in the above process with equal amounts of a polymer prepared in the presence of di(ethyl phenyl) phosphite.

I claim as my invention:

1. A process for preparing polyols having high functionality which comprises treating a polymer of an alpha,-beta-ethylenically unsaturated aldehyde of the group consisting of acrolein and methacrolein which has been formed by polymerizing the alpha,beta-ethylenically unsaturated aldehyde in the presence of a catalyst of the group consisting of trihydrocarbyl phosphines, trihydrocarbyl arsines and trihydrocarbyl and dihydrocarbyl phosphites which has not been subjected to any hydrolytic treatment and which has a molecular weight of 400 to 4500 as determined ebullioscopically in tetrachloroethane, with hydrogen at a temperature between 50° C. and 300° C., and a pressure of between 50 p. s. i. and 3000 p. s. i. in the presence of a hydrogenation catalyst.

2. A process as in claim 1 wherein the unsaturated aldehyde is acrolein.

3. A process as in claim 1 wherein the unsaturated aldehyde is methacrolein.

4. A process for preparing polyols having high functionality which comprises treating a polymer of acrolein which has been formed by contacting the acrolein in an alkanol solvent with from 0.1% to 10% by weight of a special catalyst of the group consisting of trihydrocarbyl phosphines, trihydrocarbyl arsines and trihydrocarbyl and dihydrocarbyl phosphites which has not been subjected to any hydrolytic treatment and which has a molecular weight of 400 to 4500 as determined ebullioscopically in tetrachloroethane, with hydrogen at a temperature between 50° C. and 300° C., and a pressure between 50 p. s. i. and 3000 p. s. i. in the presence of hydrogenation catalyst.

5. A process as in claim 4 wherein the catalyst used in polymerizing the acrolein is triphenyl phosphine.

6. A process as in claim 4 wherein the catalyst used in polymerizing the acrolein is tricyclohexyl arsine.

7. A process as in claim 4 wherein the catalyst used in polymerizing the acrolein is triphenyl phospite.

8. A process as in claim 4 wherein the catalyst used in polymerizing the acrolein is tricyclohexyl phosphite.

9. A process as in claim 4 wherein the catalyst used in polymerizing the acrolein is tri(3,3,5-trimethylcyclohexyl)phosphine.

10. A process for preparing polyols having high functionality which comprises treating a polymer of acrolein which has been formed by contacting the acrolein in an alkanol solvent with from 0.1% to 10% by weight of a trihydrocarbyl phosphine which has not been subjected to any hydrolytic treatment and which has a molecular weight of 400 to 4500 as determined ebullioscopically in tetrachloroethane, with hydrogen at a temperature between 50° C. and 300° C., and a pressure between 50 p. s. i. and 3000 p. s. i. in the pressure of a hydrogenation catalyst.

11. A polyol prepared by the process of claim 1.
12. A polyol prepared by the process of claim 4.
13. A polyol prepared by the process of claim 8.
14. A polyol prepared by the process of claim 10.

References Cited in the file of this patent

UNITED STATES PATENTS

| | | |
|---|---|---|
| 2,230,591 | Fischer et al. | Feb. 4, 1941 |
| 2,276,192 | Hanford et al. | Mar. 10, 1942 |
| 2,289,534 | Wagner | July 14, 1942 |
| 2,317,456 | Hanford et al. | Apr. 27, 1943 |
| 2,400,724 | Walker | May 21, 1946 |

(Other references on following page)

UNITED STATES PATENTS

| | | |
|---|---|---|
| 2,407,766 | Perrine et al. | Sept. 17, 1946 |
| 2,489,711 | Jayne et al. | Nov. 29, 1949 |
| 2,554,973 | Ballard et al. | May 29, 1951 |
| 2,694,077 | Stansbury et al. | Nov. 9, 1954 |

OTHER REFERENCES

Davies et al.: J. Chem. Soc. (London), 1937, pp. 1622 to 1677.

Kosolapoff: "Organic Phosphorous Compounds," Wiley & Sons, New York, 1950; pp. 23 to 28 and 192 to 199.